United States Patent
Havinis et al.

(10) Patent No.: US 6,516,197 B2
(45) Date of Patent: *Feb. 4, 2003

(54) SYSTEM AND METHOD FOR REPORTING THE NUMBER AND/OR DURATION OF POSITIONING REQUESTS FOR TERMINAL-BASED LOCATION CALCULATION

(75) Inventors: Theodore Havinis, Plano, TX (US); David Boltz, Garland, TX (US)

(73) Assignee: Ericsson Inc., Research Triangle Park, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/272,693

(22) Filed: Mar. 18, 1999

(65) Prior Publication Data

US 2002/0077116 A1 Jun. 20, 2002

(51) Int. Cl.[7] .................................................. H04Q 7/20
(52) U.S. Cl. ....................................... 455/456; 455/414
(58) Field of Search ................................. 455/456, 404, 455/435, 412, 413, 414, 433, 436, 553, 457

(56) References Cited

U.S. PATENT DOCUMENTS

| | | | | |
|---|---|---|---|---|
| 5,629,710 A | * | 5/1997 | Sawada | 342/457 |
| 5,724,660 A | * | 3/1998 | Kauser et al. | 455/456 |
| 6,002,936 A | * | 12/1999 | Roel-Ng et al. | 455/456 |
| 6,108,553 A | * | 8/2000 | Silventoinen et al. | 455/456 |

* cited by examiner

Primary Examiner—Vivian Chin
Assistant Examiner—James K Moore
(74) Attorney, Agent, or Firm—Jenkens & Gilchrist, P.C.

(57) ABSTRACT

A telecommunications system and method is disclosed for requiring a mobile station (MS) to notify the network of the number and/or duration of positionings performed by the MS. A service program or API (Application Program Interface), e.g., JAVA program, which is responsible for collecting information regarding the requests for location information, is either included in a Subscriber Identity Module (SIM) card, or other memory, of the MS, or downloaded to the SIM card in the MS. As a result of performing a location calculation, the API within the MS initiates a mobile originated reporting Short Message Service (SMS) or Unstructured Supplementary Service Data (USSD) message to the serving network, which includes a time stamp of the time and date the positioning request was received, the number and/or duration of the positioning(s) and the final location of MS.

16 Claims, 10 Drawing Sheets

SYSTEM AND METHOD FOR REPORTING THE NUMBER AND/OR DURATION OF POSITIONING REQUESTS FOR TERMINAL-BASED LOCATION CALCULATION

BACKGROUND OF THE PRESENT INVENTION

1. Field of the Invention

The present invention relates generally to telecommunications systems and methods for positioning a mobile station within a cellular network, and specifically to reporting the number and/or duration of positioning requests performed by a mobile station.

2. Background and Objects of the Present Invention

Cellular telecommunications is one of the fastest growing and most demanding telecommunications applications. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

With reference now to FIG. 1 of the drawings, there is illustrated a GSM Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC 14 provides a circuit switched connection of speech and signaling information between a Mobile Station (MS) 20 and the PLMN 10. The MSC/VLR areas 12, in turn, include a plurality of Location Areas (LA) 18, which are defined as that part of a given MSC/VLR area 12 in which the MS 20 may move freely without having to send update location information to the MSC 14 that controls the LA 18. Each LA 18 is divided into a number of cells 22. The MS 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the cell 22 for which it is responsible. It should be understood that the BSC 23 may be connected to several BTS's 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information, for subscribers registered within that PLMN 10. The HLR 26 may be co-located with a given MSC 14, integrated with the MSC 14, or alternatively can service multiple MSCs 14, the latter of which is illustrated in FIG. 1.

Determining the geographical position of an MS 20 within a cellular network 10 has recently become important for a wide range of applications. For example, location services (LCS) may be used by transport and taxi companies to determine the location of their vehicles. In addition, for emergency calls, e.g., 911 calls, the exact location of the MS 20 may be extremely important to the outcome of the emergency situation. Furthermore, LCS can be used to determine the location of a stolen car, for the detection of home zone calls, which are charged at a lower rate, for the detection of hot spots for micro cells, or for the subscriber to determine, for example, the nearest gas station, restaurant, or hospital, e.g., "Where am I" service.

As can be seen in FIG. 2 of the drawings, upon a network positioning request for a particular target MS 20, the MSC 14 obtains, from the serving BTS 24 and BSC 23, a Timing Advance (TA) value, which corresponds to the amount of time in advance that the MS 20 must send a message in order for the serving BTS 24 to receive it in the time slot allocated to that MS 20. The TA value, in turn, provides location information regarding the MS 20 location. This is due to the fact that when a message is sent from the MS 20 to the BTS 24, there is a propagation delay, which depends upon the distance between the MS 20 and the BTS 24. The TA values are expressed in bit periods, and can range from 0 to 63, with each bit period corresponding to approximately 550 meters between the MS 20 and the BTS 24.

This TA value is forwarded to a Serving Mobile Location Center (SMLC) 270 for use in assisting the calculation of the geographical location of the MS 20. It should be noted that the SMLC 270 can use a number of different positioning mechanisms, including, but not limited to, Time of Arrival (TOA), which is a network-based positioning method, or Enhanced Observed Time Difference (E-OTD) or Global Positioning System (GPS), which are both MS-based positioning methods. After the SMLC 270 calculates the MS 20 location, this location can be sent to a Location Application (LA) 280 that requested the positioning. It should be noted that the requesting LA 280 could be located within the MS 20 itself, within the MSC 14 or could be an external node, such as an Intelligent Network (IN) node. If the LA 280 is not within the MS 20 or within the MSC 14, the location information is sent to the requesting LA 280 via the MSC 14 and a Gateway Mobile Location Center (GMLC) 290.

As mentioned above, two common types of MS-based positioning methods are the E-OTD method and the GPS method. For the GPS method, the MS 20 can have a Global Positioning System (GPS) receiver built into it, which is used to obtain positioning data, which is sent to the SMLC 270 to determine the location of the MS 20. For the E-OTD method, the MS 20 can collect positioning data based on the Observed Time Difference (OTD) between the time a BTS 24 sends out a signal and the time the MS 20 receives the signal. This time difference information can be sent to the SMLC 270 for calculation of the location of the MS 20, or the MS 20 itself, with knowledge of the location of the BTS 24, can determine it's location. It should be noted that it is expected in the near future for the GPS receiver within the MS 20 to be able to calculate the MS 20 location.

By utilizing the E-OTD or GPS positioning method and implementing the location calculation functionality within the MS 20 itself, it is no longer necessary to have active two-way communication between the MS 20 and the network 10, which advantageously reduces the signaling traffic on the network 10. This is especially true for the situation where the requesting LA 280 includes in the positioning request an indication of the frequency and duration of the positioning. Once the MS 20 receives the positioning request, along with the duration and frequency information, the MS 20 can continuously position itself without any further contact with the network 10.

However, as a result of the lack of communication with the network 10, especially when the positioning request instructs the MS 20 to position itself multiple times or for a certain period of time, the network 10 may not be informed of the number and/or duration of the location calculations performed by the MS 20. This type of information may be useful to the network 10 for charging or statistical purposes.

It is, therefore, an object of the present invention to require the MS to notify the network of the number and/or duration of positionings performed by the MS.

SUMMARY OF THE INVENTION

The present invention is directed to telecommunications systems and methods for requiring a mobile station (MS) to notify the network of the number and/or duration of positionings performed by the MS. A service program or API (Application Program Interface), e.g., JAVA program, which is responsible for collecting information regarding the requests for location information, is either included in a Subscriber Identity Module (SIM) card, or other memory, of the MS or downloaded to the SIM card in the MS. As a result of performing a location calculation, the API within the MS initiates a mobile originated reporting Short Message Service (SMS) or Unstructured Supplementary Service Data (USSD) message to the serving network, which includes a time stamp of the time and date the positioning request was received, the number and/or duration of the positioning and the final calculated location of the MS.

Alternatively, this information can be uploaded to the network using a Wireless Application Part (WAP) interface. In addition, the reporting message can be sent either on a per positioning request basis or on a per selected reporting frequency basis, in which the reporting frequency is determined by the network. If the reporting message is sent on a reporting frequency basis, the information, e.g., time stamp, duration and location, can be stored in the SIM card until the reporting message is sent. Advantageously, by notifying the network of the number and/or duration of positionings that the MS performs, the network can ensure that there is not a loss of extra revenue when MS's perform their own location calculations.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
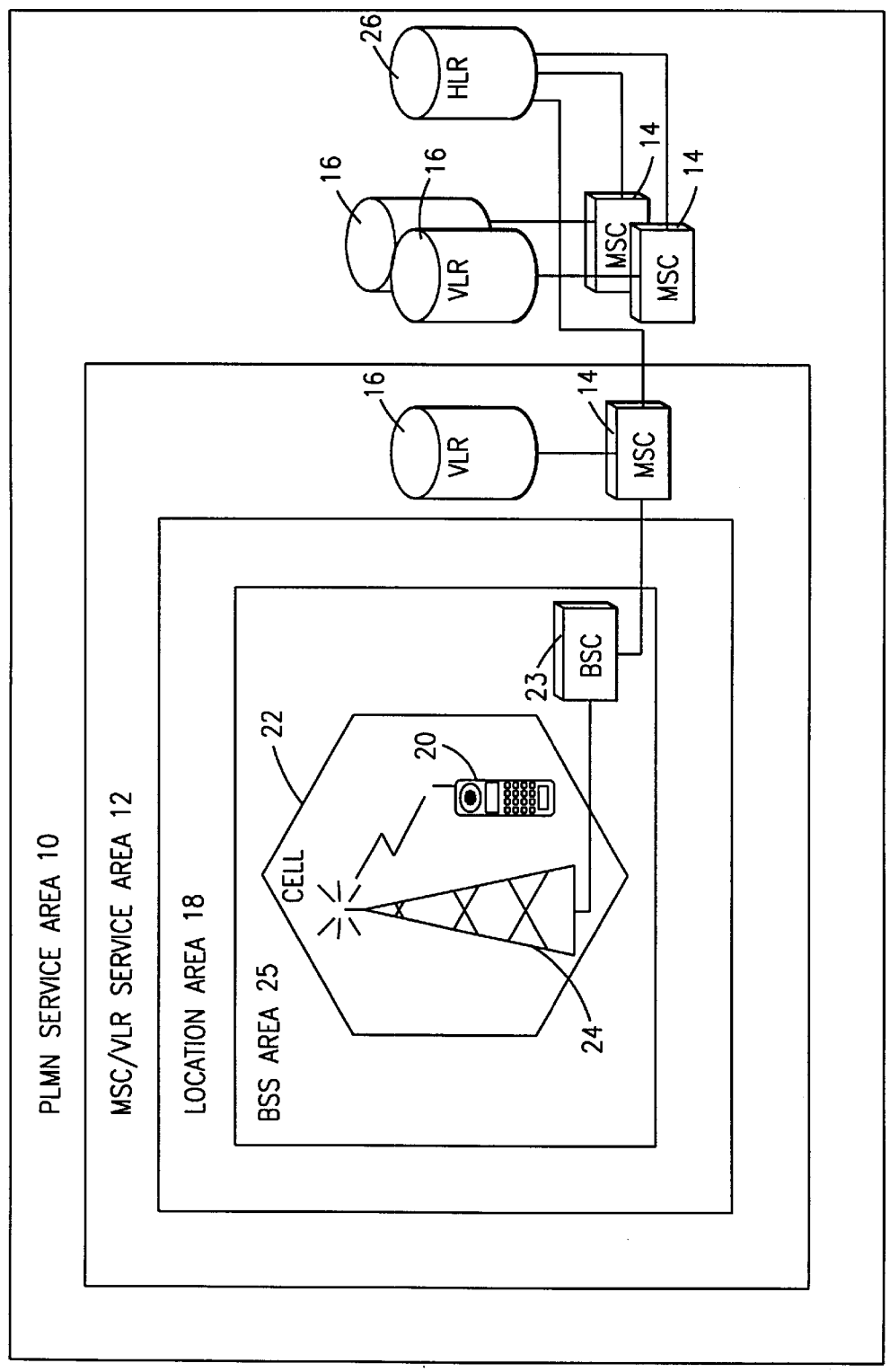
FIG. 1 is a block diagram of a conventional wireless telecommunications system.
Figure 2:
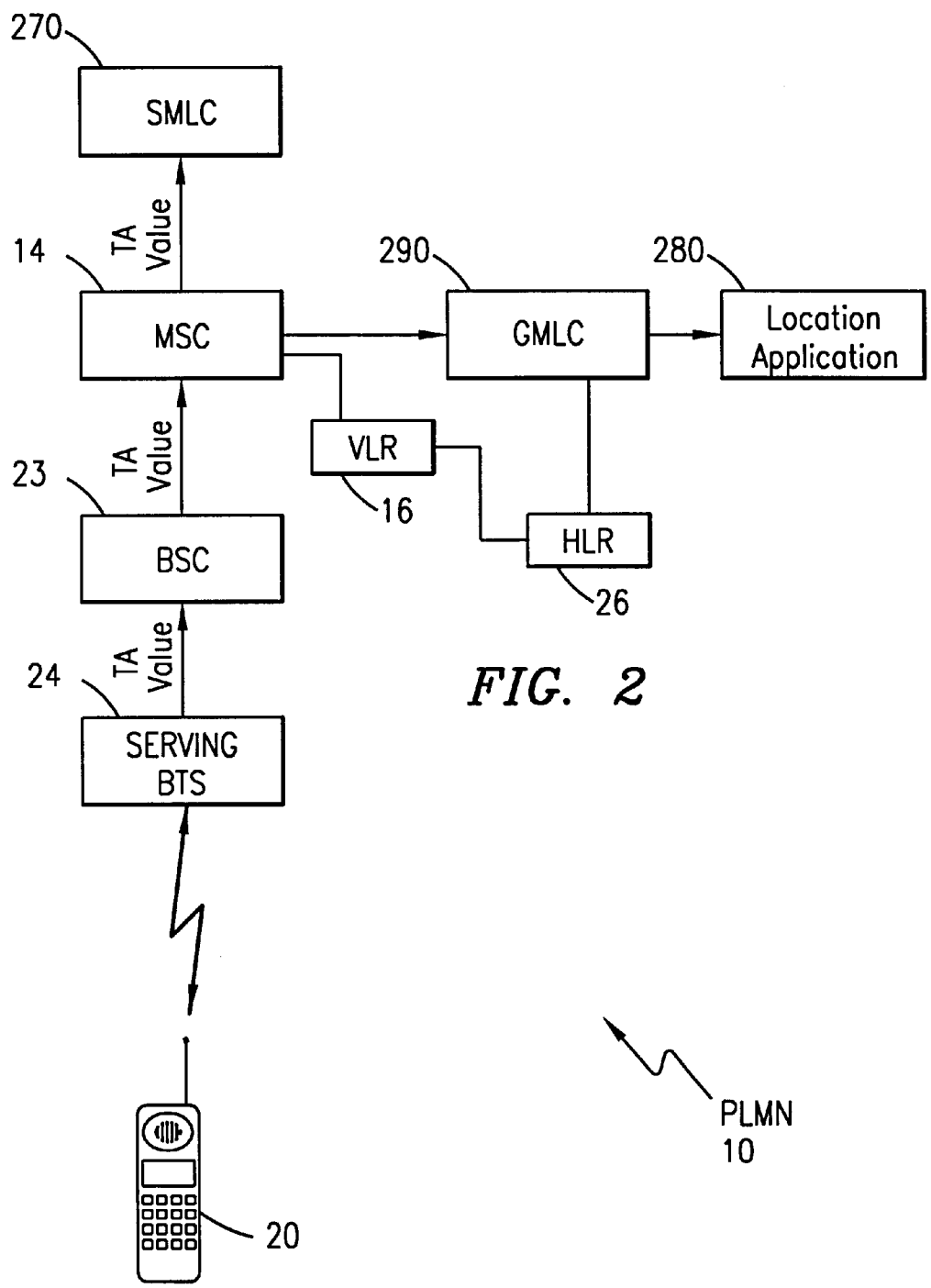
FIG. 2 is a block diagram illustrating a conventional sample positioning of a mobile station within a cellular network.
Figure 3:
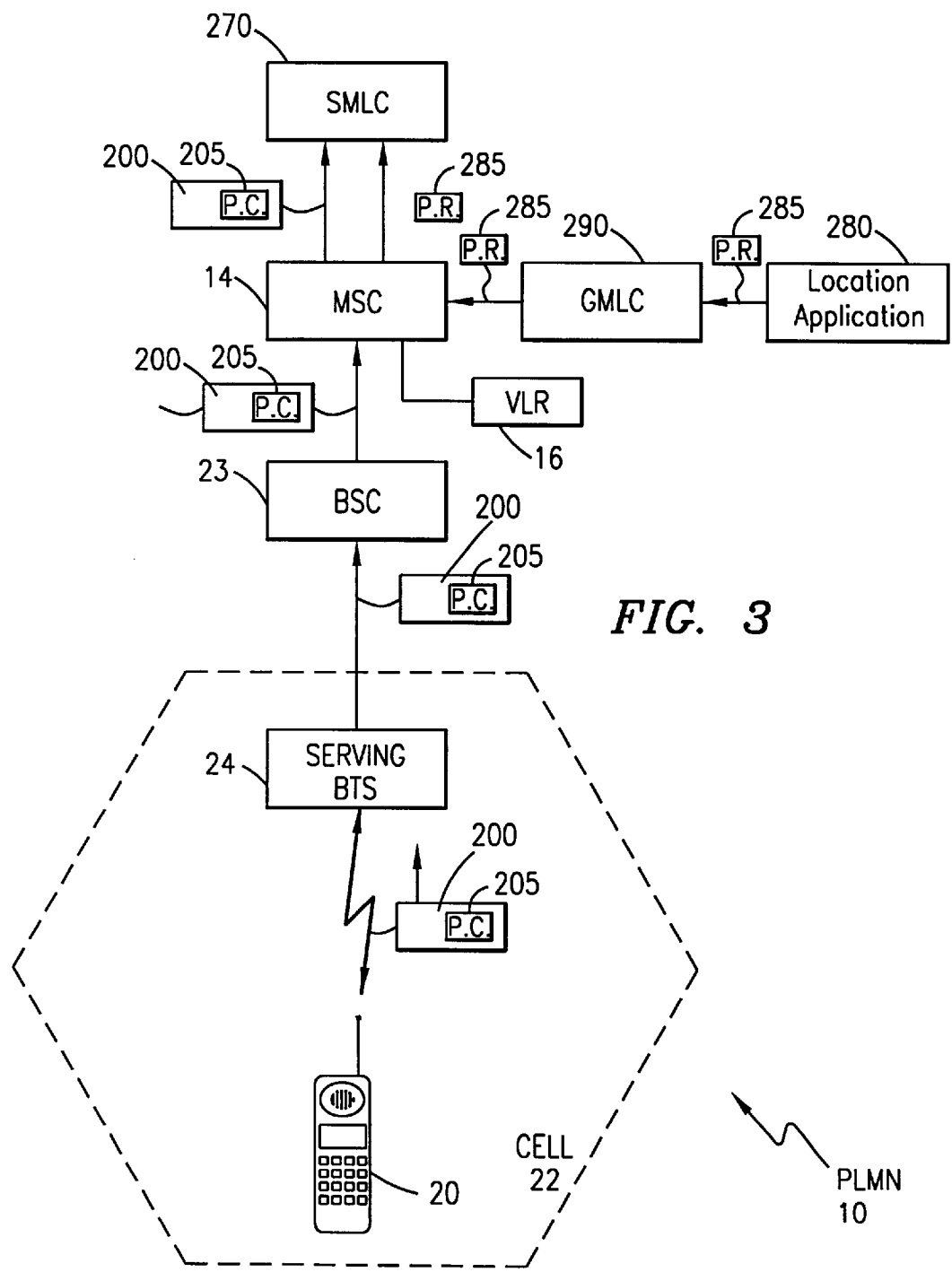
FIG. 3 illustrates providing a serving mobile location center with various terminal-based positioning methods that may be performed by a particular mobile station.

With reference now to FIG. 3 of the drawings, when a positioning request 285 for a particular target Mobile Station (MS) 20 is received by a Serving Mobile Location Center (SMLC) 270 serving the cell 22 within the Public Land Mobile Network (PLMN) 10 that the MS 300 is currently located in, the SMLC 270 must choose the optimum positioning method available. Positioning methods can be network-based, e.g., Timing Advance (TA) method, Time of Arrival (TOA) method, or Angle of Arrival (AOA) method, or terminal-based, e.g., Global Positioning System (GPS) method, Observed Time Difference (OTD) method, or Enhanced OTD (E-OTD) method. In order for the SMLC 270 to have knowledge of the terminal-based positioning methods, this information must be sent to the SMLC 270 together with the positioning request 285. Therefore, the MS 20 positioning capabilities can be sent to a serving Mobile Switching Center/Visitor Location Register (MSC/VLR) 14/16 when the MS 20 registers with the MSC/VLR 14/16.

For example, in GSM systems, the MS 20 positioning method capabilities can be passed towards the MSC/VLR 14/16 with the existing GSM message BSSMAP CLASSMARK UPDATE message 200, as is understood in the art. Specifically, as discussed in co-pending patent application Ser. No. 09/037,071 to Stephen Hayes et al., which is hereby incorporated by reference, the "classmark information element 3" in the CLASSMARK UPDATE message 200 can be extended to include MS 20 positioning capabilities 205. As is known in the art, the CLASSMARK UPDATE message 200 typically describes attributes of the MS 20, such as encryption capabilities, RF power level supported and short message capability. For example, the MS 20 positioning methods can be sent towards the network 10 as part of controlled early classmark sending, during dedicated mode, when the MS 20 wishes to indicate to the MSC/VLR 14/16 a change of positioning capabilities, after a BSSMAP CLASSMARK REQUEST message from the MSC/VLR 14/16, in which case the MS 20 can send the CLASSMARK UPDATE message 200, including the positioning capabilities 205. Alternatively, the MS 20 can send a HANDOVER REQUEST message (not shown), including the MS 20 positioning capabilities 205, to the target BSC 23 via a Base Transceiver Station (BTS) 24.

This positioning capability information 205 shall indicate to the MSC/VLR 14/16 whether the MS 20 can support terminal-based positioning, the type of terminal-based positioning methods supported, and whether the MS 20 is capable of performing location calculations based upon the positioning measurements that it performed itself. Once the MSC/VLR 14/16 receives the terminal-based positioning methods, this information can be sent to the SMLC 270 for later use in determining the optimum positioning method.

Thus, if the MS 20 has terminal-based positioning capabilities, along with terminal-based location calculation abilities, when the SMLC 270 receives the positioning request 285, the SMLC 270 can opt to allow the MS 20 to both obtain positioning measurements and to calculate it's own location based upon those positioning measurements. However, as discussed hereinbefore, if the MS 20 obtains the positioning measurements and determines it's own location, the active two-way communication normally involved in the positioning process between the MS 20 and the network 10 is eliminated, which reduces the ability of the network 10 to be informed about the number and/or duration of the positioning(s).

Figure 4:
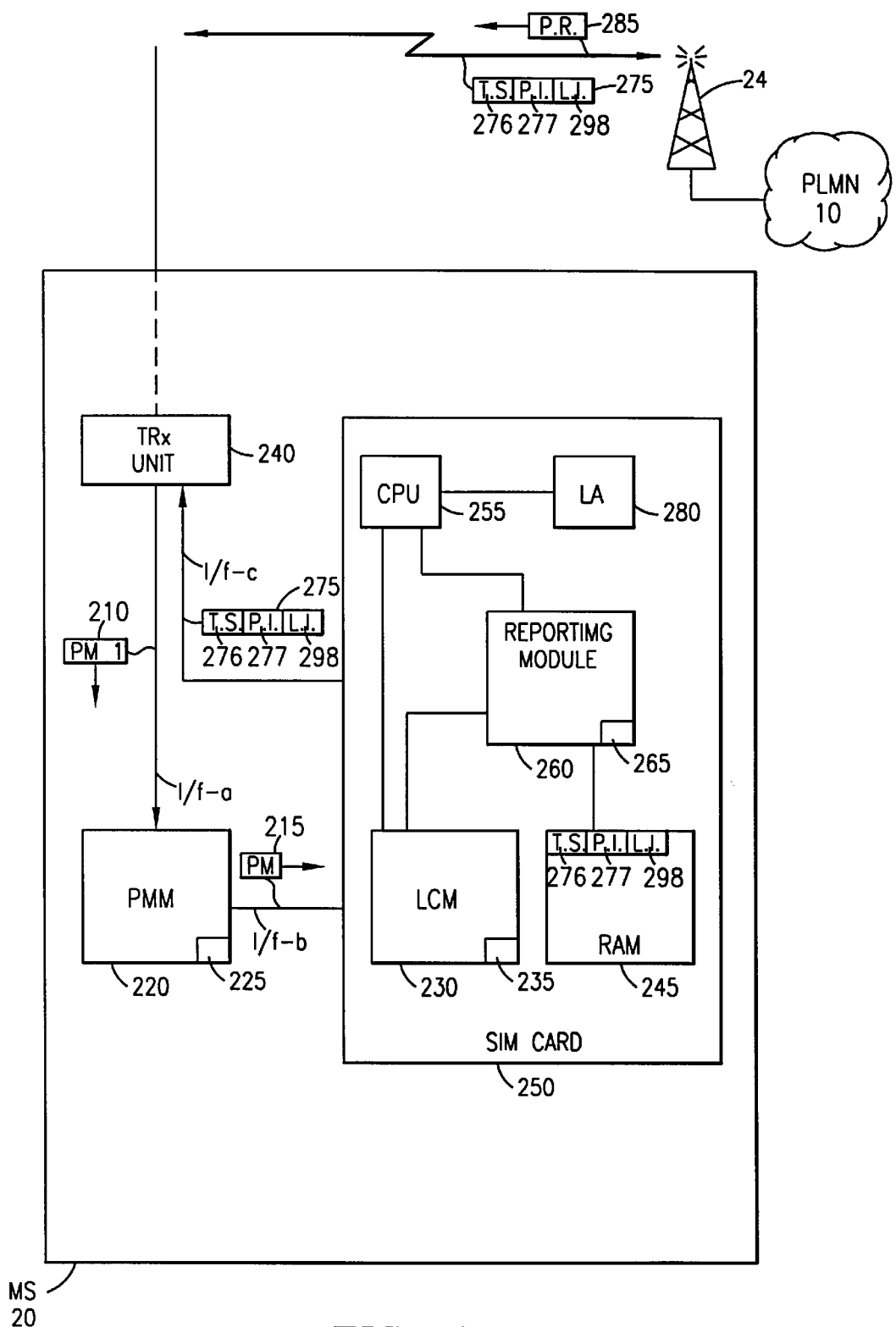
FIG. 4 illustrates the reporting of positioning information related to terminal-based calculated location information in accordance with embodiments of the present invention.

Therefore, as shown in FIG. 4 of the drawings, a reporting module 260, such as a service program or Application Program Interface (API), e.g., JAVA program, which is responsible for collecting and reporting to the network 10 information regarding the received positioning requests 285, can be either included in a Subscriber Identity Module (SIM) card 250, or other memory, of the MS 20 or downloaded to the SIM card 250 in the MS 20. Alternatively, the reporting module 260 can be included within or downloaded to the SIM card 250 within a Universal Mobile Telecommunications System (UMTS), which is a new type of MS 20.

The reporting module 260 can be downloaded to the MS 20, for example, as a part of the Virtual Home Environment (VHE) of the mobile subscriber associated with the MS 20, using a Mobile Station Application Executory Environment (MexE) or SIMTOOL kit or a Wireless Application Part (WAP) interface to a web server containing the reporting module 260 software. The VHE defines a system concept for personalized service portability across network boundaries and between terminals. The MexE provides a standardized execution environment in an MS 20 and provides the MS 20 with the ability to negotiate it's supported capabilities with a MexE service provider, which allows applications to be developed independently of any MS 20 platform. On the other hand, the SIMTOOL kit provides applications within the SIM card 250 with the ability to interact and operate with any MS 20 that supports the specific requirements of the applications.

Once the MS 20 with the reporting module 260 therein receives the positioning request 285, which can include the number and/or duration of the positioning(s) that the MS 20 must perform, the MS 20 begins to calculate its' own location. As is understood in the art, for terminal-based location calculation methods, the cellular network 10 serving the MS 20 sends to the MS 20 positioning measurement information 210, e.g., BTS 24 coordinates information broadcasted on the Broadcast Control Channel (BCCH) unencrypted to the MS 20, along with other necessary information, depending upon the positioning method used, regardless of the location of the MS 20. The MS 20 calculates it's own location in idle or dedicated mode based upon its own positioning measurements 215, the additional information 210 supplied by the network 10 and a location calculation function within the MS 20.

Specifically, the location calculation within the MS 20 can be carried out by utilizing a Positioning Measurement Module (PMM) 220 within the MS 20 for performing the positioning measurements 215 with the aid of information 210 from the network 10, which is sent over interface I/f-a from a Transceiver (TRX) unit 240, and an algorithm 225 specific to the positioning method used. Thereafter, a Location Calculation Module (LCM) 230 within the MS 20 can convert the positioning measurements 215 to location information 298 with the aid of the network information 210 and an algorithm 235 for performing the conversion.

When the PMM 220 obtains the positioning measurements 215, the PMM 220 sends the positioning measurements 215 to the LCM 230 within the SIM card 250 over interface I/f-b. The LCM 230 uses these positioning measurements 215 as well as the network information 210 and the positioning algorithm 235 to perform the conversion and calculate the location 298, e.g., X, Y coordinates, of the MS 20.

As a result of performing a location calculation, the reporting module 260 within the MS 20 initiates a mobile originated reporting Short Message Service (SMS) or Unstructured Supplementary Service Data (USSD) message 275 to the serving network 10, which includes a time stamp 276 of the time and date the positioning request was received, positioning information 277, such as the number and/or duration of the positioning(s) and the final calculated MS 20 location 298. Alternatively, this reporting message 275 can be uploaded to the network 10 using a Wireless Application Part (WAP) interface. In addition, the reporting message 275 can be sent either on a per positioning request 285 basis or on a per selected reporting frequency 265 basis, in which the reporting frequency 265 is determined by the network 10 and included in the reporting module 260. If the reporting message 275 is sent on a selected reporting frequency 265 basis, the time stamp 276, positioning information 277 and final calculated MS 20 location 298, can be stored in a memory, such as a Random Access Memory (RAM) 245, within the SIM card 250 until the reporting message 275 is sent.

The reporting module 260 can transmit the SMS or USSD message 275 to the network 10 by passing the time stamp 276, positioning information 277 and final calculated MS 20 location 298 to the TRX unit 240 over interface I/f-c for transmission to the network 10. In addition, it should be understood that the SIM card 250 preferably contains a central processing unit (CPU) 255 for controlling the flow of information between the PMM 220, LCM 230, RAM 245, reporting module 260 TRX unit and any internal LA 280. Furthermore, in order to offer the reporting service seamlessly, the platform executing the reporting module 260 described above must be either an open platform or bilaterally agreed between the home network 10 and a visiting network (not shown) if the MS 20 is roaming.

Figure 5:
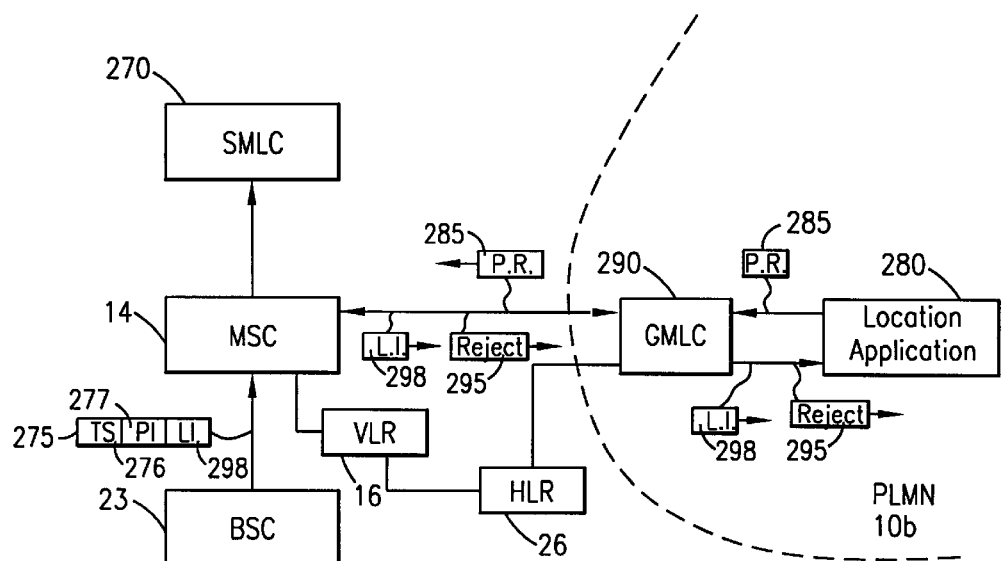
FIG. 5 illustrates a sample positioning process in accordance with embodiments of the present invention.
Figure 5:
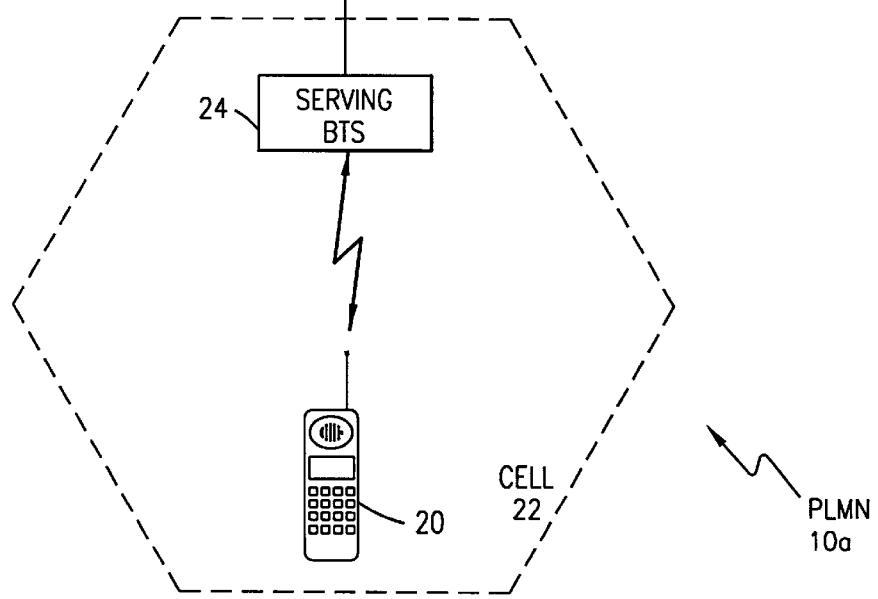
Figure 6:
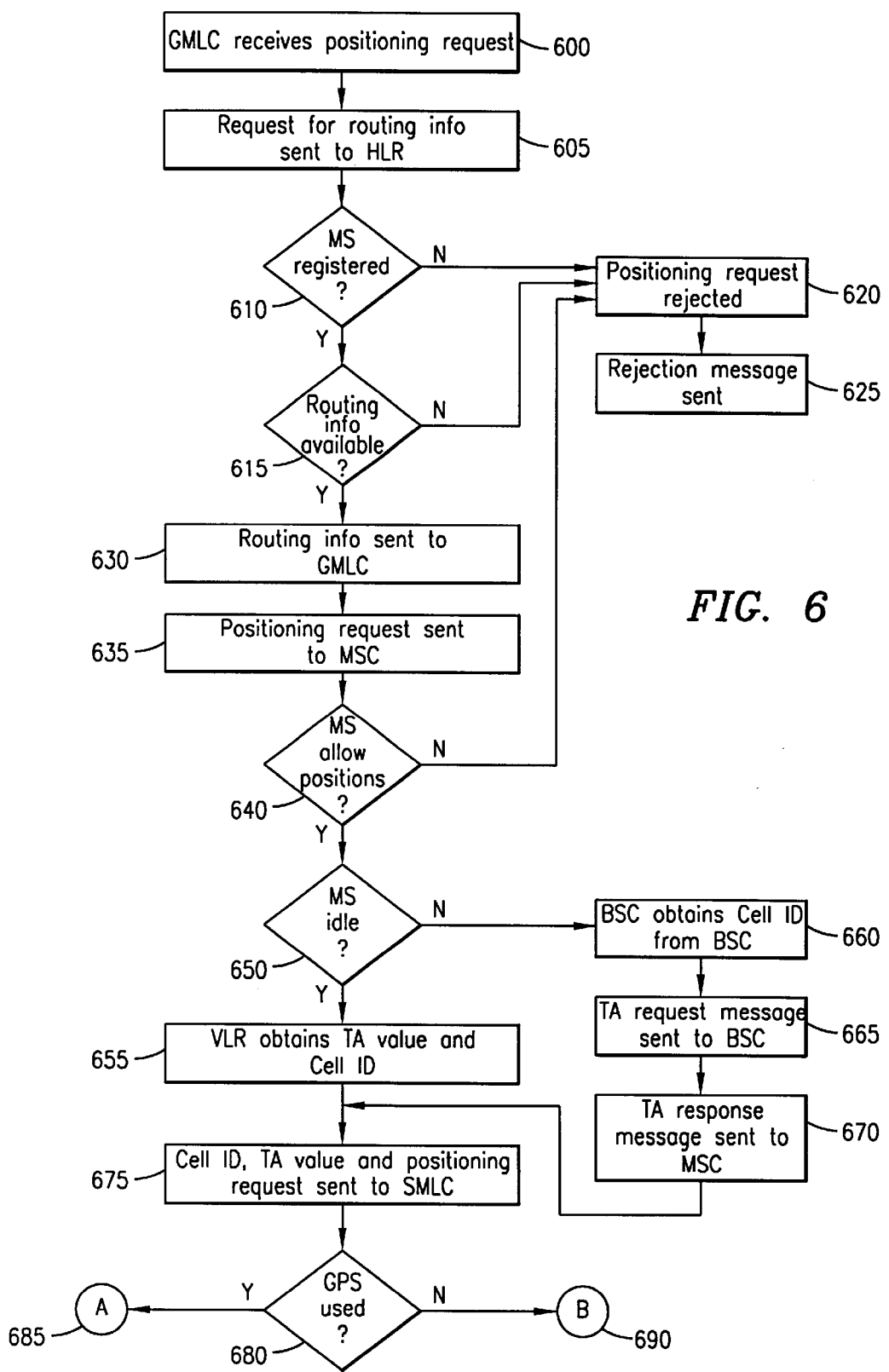
FIG. 6 shows steps in implementing the sample positioning process shown in FIG. 5 of the drawings.

A more complete understanding of aspects of the positioning process involved in the present invention will now be described with reference to FIG. 5 of the drawings, which will be described in connection with the steps listed in FIG. 6 of the drawings. Positioning of a particular target MS 20 typically begins by a Location Application (LA) 280 (or location node 280) sending a positioning request 285, which specifies the particular Mobile Station Integrated Services Digital Network (MSISDN) number associated with the particular target MS 20 to be positioned, to a Gateway Mobile Location Center (GMLC) 290 within the Public Land Mobile Network (PLMN) 10b of the LA 280 (step 600). In addition, the positioning request 285 can include the duration and/or number of positionings to be performed by the MS 20, as discussed hereinbefore.

When the GMLC 290 receives the positioning request 285 (step 600), the GMLC 290 sends a request for routing information (step 605), e.g., the address of the serving MSC 14 within the PLMN 10a that the MS 20 is currently located in, to the MS's Home Location Register (HLR) 26, using the MS's 20 directory number as a global title. The signaling network, e.g., the Signaling System #7 (SS7) network (not shown), can perform a global title translation on the MSISDN and route the request to the appropriate HLR 26 for the MS 20.

The HLR 26 checks its records to confirm that the MS 20 is registered in the HLR 26 (step 610), and that routing information for that MS 20 is available (step 615). If the MS 20 is not registered in the HLR 26 (step 610) or the routing information is not available (step 615), the positioning request 285 is rejected (step 620) and the GMLC 290 sends a rejection message 295 to the requesting LA 280 (step 625). However, if the MS 20 is registered in the HLR 26 (step 610) and routing information for the MSC 14 is available (step 615), the routing information, e.g., the MSC 14 address, is sent to the GMLC 290 (step 630). Using this MSC 14 address, the GMLC 290 transmits a MAP_PROVIDE_SUBSCRIBER_LOCATION message, which contains the positioning request 285, to the serving MSC 14 (step 635).

The MSC 14 verifies that the MS 20 allows positioning to be performed (step 640), e.g., by checking privacy information, such as a Subscriber Location Privacy Profile (SLPP), which is sent to the Visitor Location Register (VLR) 16 associated with the serving MSC 14 by the HLR 26. If the MS 20 does not allow positioning (step 640), the positioning request 285 is rejected (step 620) and a rejection message 295 is sent to the LA 280 (step 625).

However, if the MS 20 does allow positioning (step 640), and the MS 20 is in idle mode (step 650), the VLR 16 performs paging and authentication of the MS 20, along with ciphering of the positioning data. This procedure provides the current cell 22 ID and Timing Advance (TA) value for a serving Base Transceiver Station (BTS) 24 in a BSSMAP Complete layer 3 message, which is used to convey a paging response (step 655). However, if the MS 20 is in dedicated mode (step 650), e.g., involved in a call connection, the MSC 14 obtains the current cell 22 ID from a serving Base Station Controller (BSC) 23 (step 660) and sends a BSSMAP TA request to the serving BSC 23 (step 665). The serving BSC 23 obtains a current TA value from the serving BTS 24 and returns this current TA value in a BSSMAP TA response to the MSC 14 (step 670).

Upon receipt of the current cell 22 ID and TA value (step 655 or 670), the MSC 14 sends a MAP_PERFORM_LOCATION message, which includes the current cell 22 ID and TA value, to the SMLC 270 associated with the MS's 20 current cell 22 location (step 675). The SMLC 270 determines the positioning method to use, e.g., Time of Arrival (TOA), Enhanced Observed Time Difference (E-OTD) or Global Positioning System (GPS) (step 680). If the positioning is successful, the MS 20 sends the location information 298 to the MSC 14, which, in turn, returns the location information 298 to the LA 280, via the GMLC 290. In addition, the reporting module 260, shown in FIG. 4 of the drawings, transmits the reporting message 275 to the serving network 10, which includes a time stamp 276 of the time and date the positioning request was received, positioning information 277, such as the number and/or duration of the positioning and the final calculated MS 20 location 298.

In accordance with aspects of the present invention, two of the terminal-based positioning methods will now be described. One of these terminal-based positioning methods is the Global Positioning System (GPS) method. GPS is a well-known technology used by many military and civilian applications. It is based upon a constellation of satellites launched by the U.S. government beginning in 1978. The GPS satellites transmit the standard positioning service (SPS) signal, which is available for civilian applications on a 1575.42 MegaHertz carrier. Each satellite uses a unique 1023-chip Gold code at a rate of 1.023 MegaHertz, such that all codes repeat at 1 millisecond intervals.

Each satellite also transmits a unique 50 bit/second navigation message containing parameters that allow GPS receivers on earth to compute a precise position solution. The navigation message includes a precise time reference as well as parameters that precisely describe the orbital positions and clock corrections for the satellites. In general, GPS receivers compute a position solution by searching for all visible satellites, which can be accomplished by correlating the received signal with replicas of the respective Gold codes, demodulating the navigation message of each visible satellite to obtain a time reference and orbital position, computing a range estimate for each visible satellite that includes the GPS receiver clock uncertainty, and, if at least four satellites are visible, computing the GPS receiver position and clock correction using the range estimate.

Figure 7:
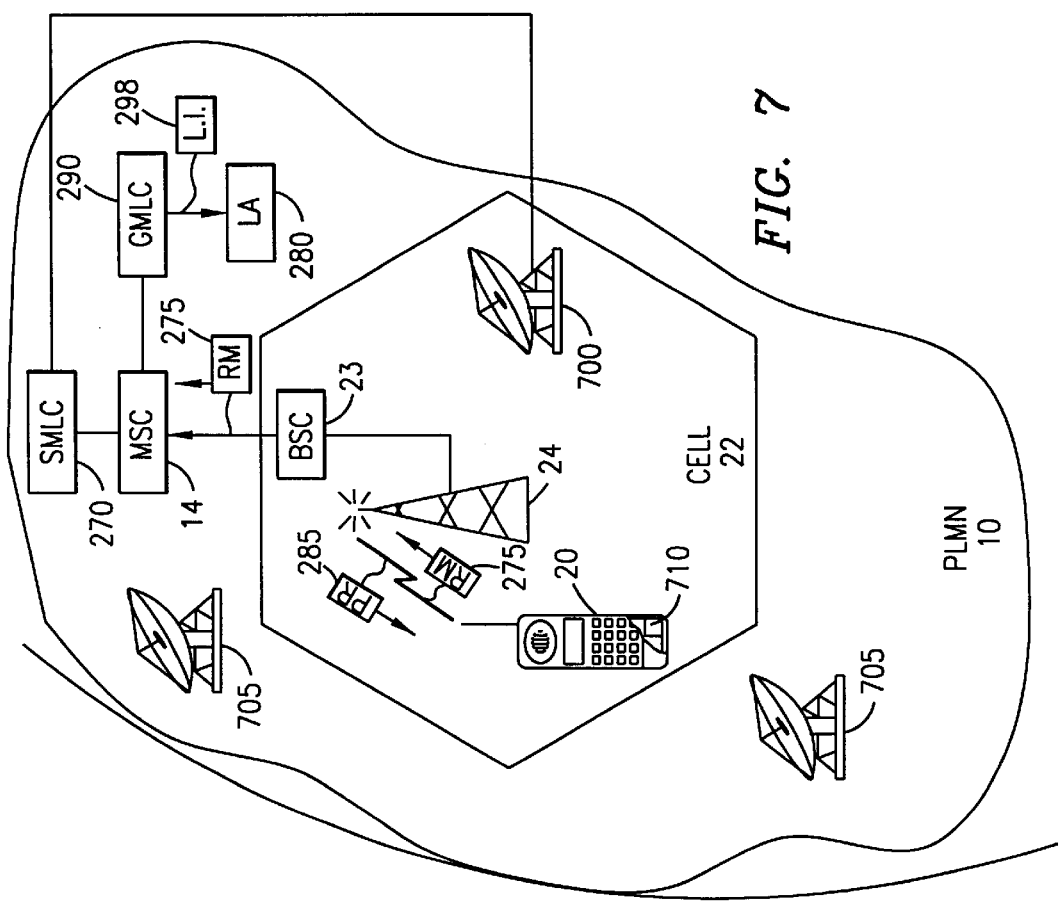
FIG. 7 illustrates a sample Global Positioning System (GPS) positioning method in accordance with embodiments of the present invention.
Figure 8:
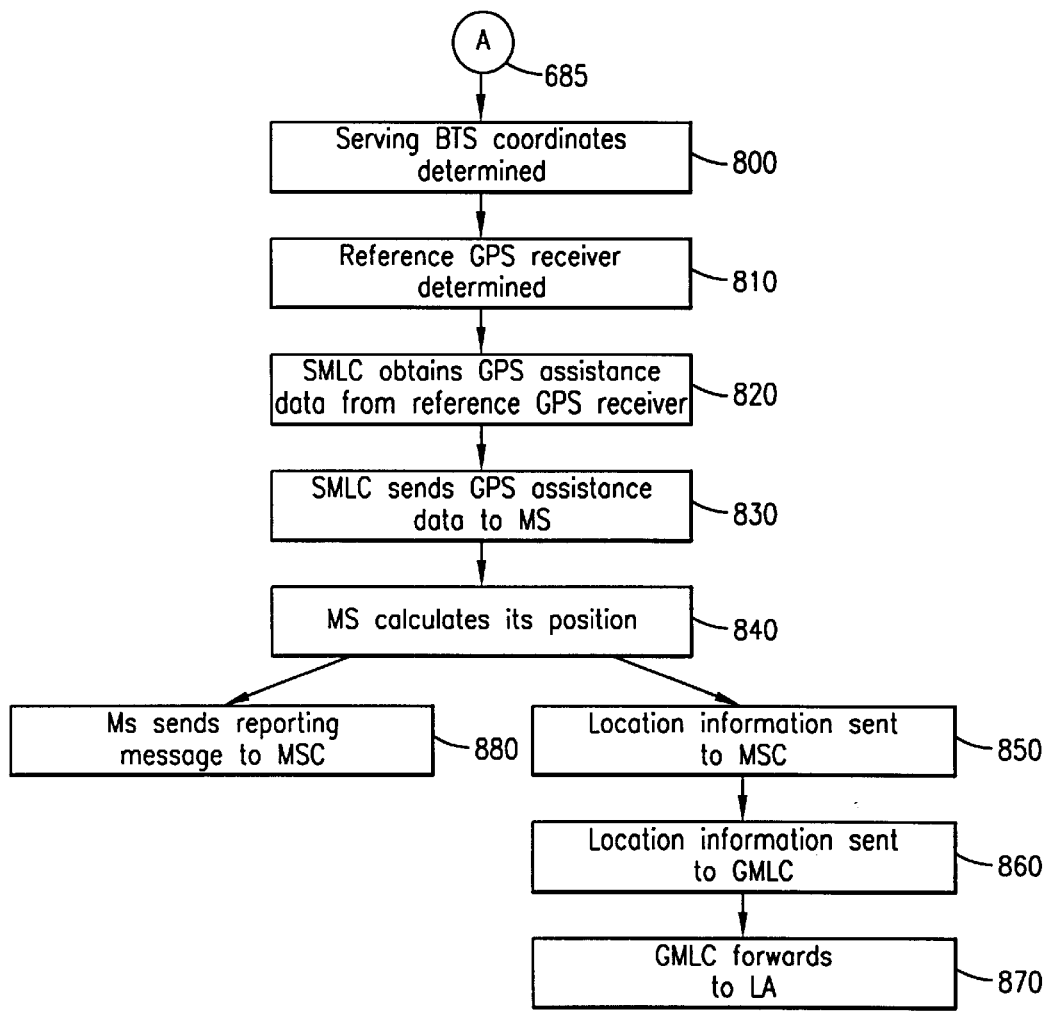
FIG. 8 shows steps in implementing the sample GPS positioning method shown in FIG. 7 of the drawings.

With reference now to FIG. 7 of the drawings, which will be described in connection with the steps listed in FIG. 8 of the drawings, when the SMLC 270 receives the cell 22 ID and TA value (step 675 in FIG. 6 of the drawings) and decides to utilize the GPS positioning method (steps 680 and 685 in FIGS. 6 and 8 of the drawings), the SMLC 270 can determine the coordinates of the serving BTS 24 (step 800), which preferably serves as the local position estimate for the MS 20, and from this information, as discussed in co-pending patent application Ser. No. 09/063,028 to Christopher H. Kingdon et al., which is hereby incorporated by reference, the SMLC 270 can determine a reference GPS receiver 700 (step 810), which is valid for the cell 22 that the MS 20 is located in. Alternatively, the SMLC 270 can determine the correct reference GPS receiver 700 (step 810) just from the cell 22 ID.

Multiple reference GPS receivers 700 and 705 are spaced throughout the PLMN 10 in order to provide accurate assistance GPS data to GPS receivers 710 within or attached to MS's 20. This data is used by the built-in GPS receiver 710 to determine the location of the MS 20 within the PLMN 10. The data in each reference GPS receiver 700 and 705 is valid in a radius of up to 300 kilometers around the reference GPS receiver 700 and 705 site (except for differential correction information, which is only valid for a radius of up to 50 kilometers), and therefore, the correct reference GPS receiver 700 for the cell 22 that the MS 20 is in must be determined to ensure the accuracy of the assistance GPS data. In addition, each reference GPS receiver 700 and 705 must be placed such that the antenna has an unobstructed view of the full sky.

After the SMLC 270 has determined the correct reference GPS receiver 700 (step 810), the SMLC 240 obtains, from the reference GPS receiver 700, the relevant assistance GPS data (step 820), such as the identity of the visible satellites 720, the orbital parameters of the satellites 720, clock corrections and differential corrections. A current requirement is that this assistance data be updated by the reference GPS receivers 700 and 705 about every thirty minutes (except for differential corrections, which are updated about every five seconds).

Once the current assistance GPS data is obtained by the SMLC 270 (step 820), this information is forwarded to the built-in or attached GPS receiver 720 within the MS 20 (step 830) via the serving MSC 14, BSC 23 and BTS 24. This assistance data corresponds to the network information 210 described in FIG. 4 of the drawings, and is preferably broadcasted to the MS 20 over the BCCH (step 830). In addition, the built-in GPS receiver 270 encompasses at least the PMM 220 and LCS 230 shown in FIG. 4 of the drawings.

Using this assistance GPS data, the built-in GPS receiver 720 within the MS 20 can obtain the GPS positioning measurements to calculate its position 298 (step 840), e.g., latitude and longitude, and transmit the calculated location information 298 to the MSC 14 (step 850). Thereafter, the MSC 14 can forward the location of the MS 20 to the GMLC 290 (step 860), which can, in turn, forward the location information 298 to the requesting LA 280 (step 870). In addition to sending the location information 298 to the network, the reporting module 260, shown in FIG. 4 of the drawings, can initiate a reporting SMS or USSD message 275, described in FIG. 4 of the drawings, towards the MSC 14 (step 880).

Figure 9:
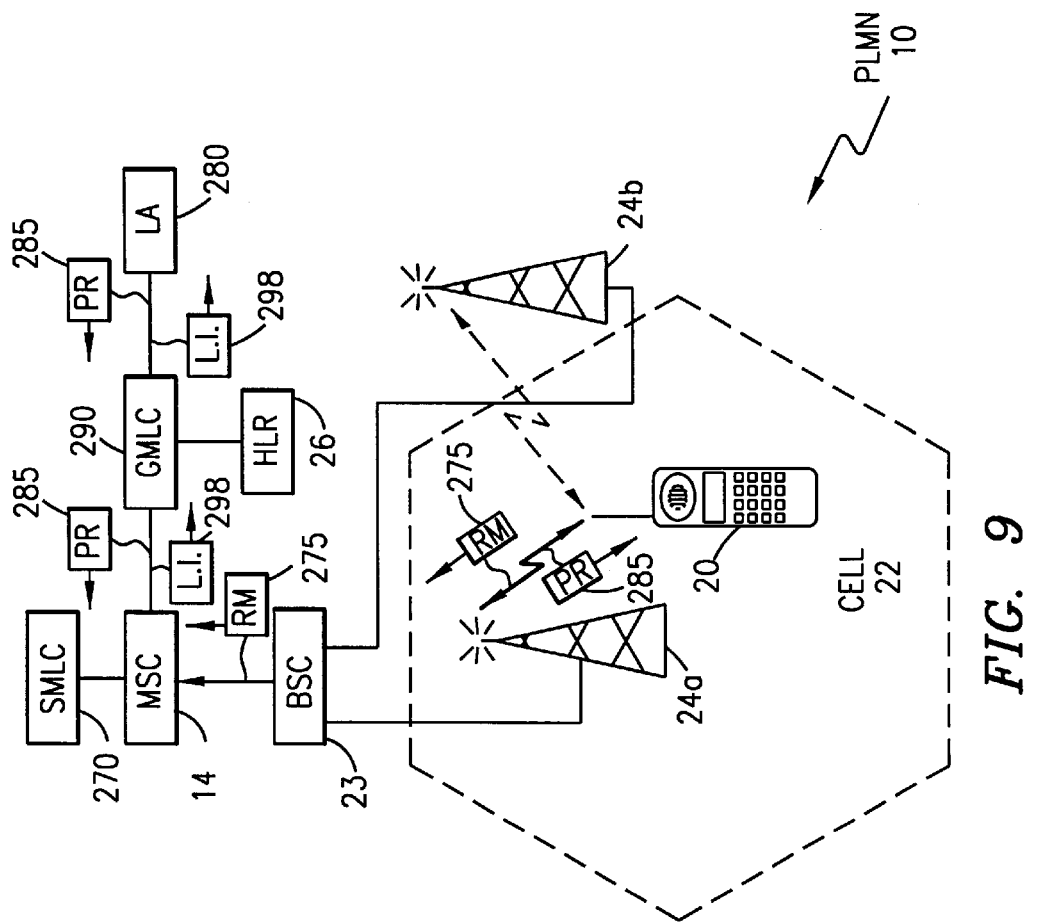
FIG. 9 illustrates a sample Enhanced-Observed Time Difference (E-OTD) positioning method in accordance with embodiments of the present invention.
Figure 10:
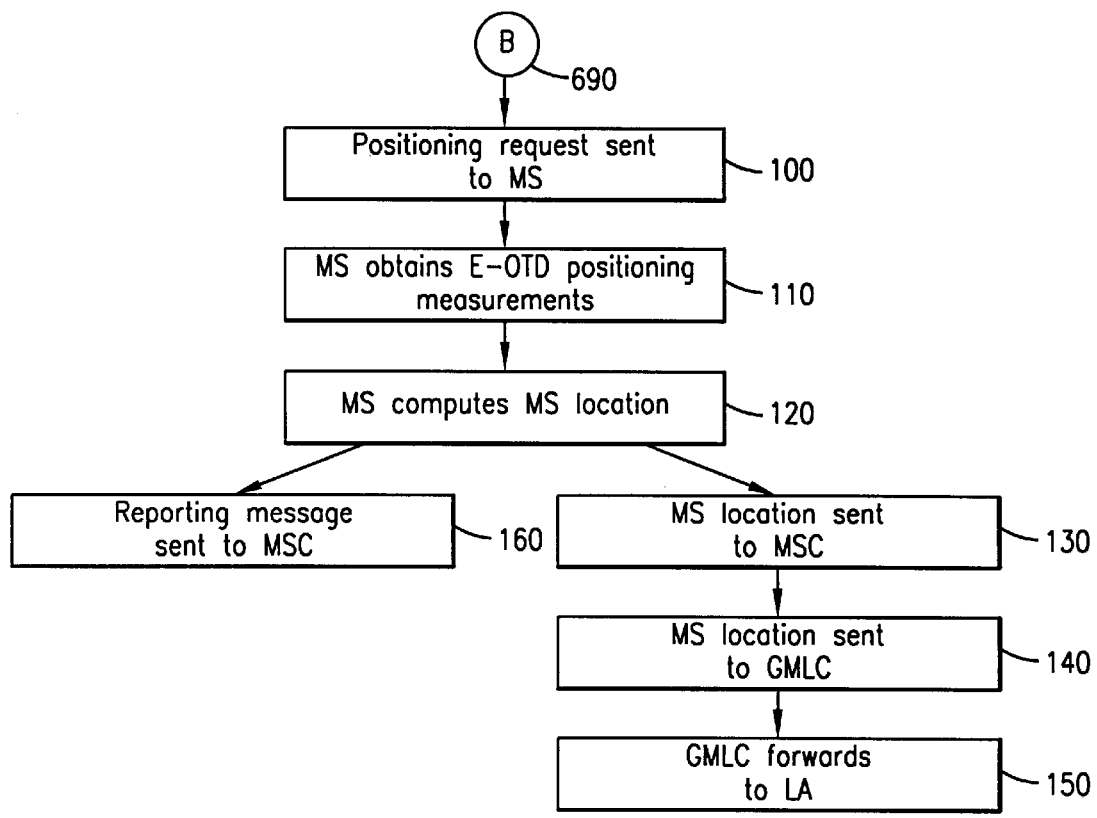
FIG. 10 shows steps in implementing the sample E-OTD positioning method shown in FIG. 9 of the drawings.

The second terminal-based positioning method is the E-OTD method. With reference now to FIG. 9 of the drawings, which will be described in connection with the steps listed in FIG. 10 of the drawings, the E-OTD method is based upon measurements in the MS 20 of the Enhanced Observed Time Difference of arrival of bursts from nearby pairs of BTS's 24a and 24b to the MS 20. To obtain accurate triangulation of the MS 20 position, E-OTD measurements are needed for at least three distinct pairs of geographically dispersed BTS's 24a and 24b, only one pair of which is shown in FIG. 9.

Thus, when the SMLC 270 receives the cell 22 ID and TA value (step 675 in FIG. 6) and decides to utilize the E-OTD positioning method (steps 680 and 690 in FIG. 6 and FIG. 10), the SMLC 270 sends the positioning request 285 to the MS 20 (step 100). The relevant BTS 24a and 24b coordinate information can be broadcast to the MS 20 on the BCCH (not shown). The MS 20 performs the requested E-OTD measurements (step 110) and computes an E-OTD location estimate 298 (step 120), as described hereinbefore in connection with FIG. 4 of the drawings.

Thereafter, the MS 20 sends this calculated location information 298 to the MSC 14 (step 130). The MSC 14 forwards the location 298 of the MS 20 to the GMLC 290 (step 140), which can, in turn, forward the location information 298 to the requesting LA 280 (step 150). In addition, along with sending the location 298 to the MSC 14, the reporting module 260, shown in FIG. 4, within the MS 20 can initiate the reporting SMS or USSD message 275, described in FIG. 4, to the MSC 14 (step 160).

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A mobile station for reporting positioning information to a network in wireless communication with said mobile station, comprising:

a transceiver unit for receiving a positioning request for said mobile station and sending a reporting message including at least said positioning information to said network;

a positioning measurement module connected to said transceiver unit for obtaining at least one positioning measurement for said mobile station;

a location calculation module for receiving said at least one positioning measurement for said positioning measurement module and calculating at least one location information identifying the location of said mobile station within said network, using said at least one positioning measurement; and a reporting module for receiving said location information from said location calculation module and initiating said reporting message towards said transceiver unit, said positioning information comprising the number of said at least one location information calculated by said mobile station and/or the duration of time over which all of said at least one location information were calculated.

2. The mobile station of claim 1, further comprising:

a memory for storing said positioning information and each said calculated location information until said reporting module initiates said reporting message.

3. The mobile station of claim 2, wherein said reporting module has a reporting frequency stored therein, said positioning information and each said calculated location information being stored in said memory until said reporting frequency indicates that said reporting module should initiate said reporting message.

4. The mobile station of claim 2, wherein said reporting message further includes a last calculated one of said at least one location information.

5. The mobile station of claim 1, wherein said reporting message further comprises a time stamp indicating the date and time that said positioning request was received by said mobile station.

6. The mobile station of claim 1, wherein said reporting message is a Short Message Service message.

7. The mobile station of claim 1, wherein said reporting message is an Unstructured Supplementary Service Data message.

8. The mobile station of claim 1, wherein said reporting message is a Wireless Application Part interface.

9. The mobile station of claim 1, wherein said positioning measurement module and said location calculation module comprise a Global Positioning System transceiver unit.

10. The mobile station of claim 1, wherein said at least one positioning measurement is an enhanced-observed time difference measurement.

11. A method for reporting positioning information by a mobile station to a network in wireless communication with said mobile station, comprising the steps of:

receiving, by said mobile station, a positioning request for said mobile station;

obtaining at least one positioning measurement by said mobile station;

calculating, by said mobile station, at least one location information identifying the location of said mobile station within said network, using said at least one positioning measurement; and sending, by said mobile station, a reporting message, including at least said positioning information, to said network, said positioning information comprising the number of said at least one location information and/or the duration of time over which all of said at least one location information were calculated.

12. The method of claim 11, further comprising the step of:

storing, within a memory within the mobile station, said positioning information and each said calculated location information.

13. The method of claim 12, wherein said step of sending further comprises the steps of:

sending said reporting message, including at least said positioning information and a last calculated one of said at least one location information, to said network.

14. The method of claim 11, wherein said step of sending further comprises the step of:

sending said reporting message, including at least said positioning information and a time stamp indicating the date and time that said positioning request was received by said mobile station, to said network.

15. The method of claim 11, wherein said step of obtaining further comprises the step of:

obtaining at least one Global Positioning System positioning measurement.

16. The method of claim 11, wherein said step of obtaining further comprises the step of:

obtaining at least one enhanced-observed time difference positioning measurement.

* * * * *